United States Patent [19]
Achelpohl et al.

[11] Patent Number: 4,701,116
[45] Date of Patent: Oct. 20, 1987

[54] EXTRUSION DIE FOR A BLOW HEAD FOR MAKING BLOWN PLASTIC FILMS

[75] Inventors: Fritz Achelpohl; Gerhard Winkler, both of Lengerich; Hermann Tüpker, Westerkapeln; Jürgen Linkies, Hagen, all of Fed. Rep. of Germany

[73] Assignee: Windmöller & Hölscher, Lengerich, Fed. Rep. of Germany

[21] Appl. No.: 780,846

[22] Filed: Sep. 27, 1985

[30] Foreign Application Priority Data

Oct. 17, 1984 [DE] Fed. Rep. of Germany ... 8430508[U]

[51] Int. Cl.⁴ .................. B29C 47/08; B29C 47/12
[52] U.S. Cl. ................... 425/72 R; 264/40.6; 264/169; 264/209.7; 425/461; 425/467
[58] Field of Search ............ 264/28, 40.6, 209.7, 264/169; 425/326.1, 381, 467, 143, 460, 461, 72 R

[56] References Cited

U.S. PATENT DOCUMENTS

| | | | |
|---|---|---|---|
| 3,920,782 | 11/1975 | Cogswell | 264/209.7 |
| 4,248,577 | 2/1981 | Bory et al. | 264/177 F |
| 4,329,314 | 5/1982 | Jackson et al. | 264/562 |
| 4,488,861 | 12/1984 | Reifenhauser | 264/40.6 |

FOREIGN PATENT DOCUMENTS 1396164 6/1975 United Kingdom .

Primary Examiner—Jay H. Woo
Assistant Examiner—Timothy W. Heitbrink
Attorney, Agent, or Firm—Fleit, Jacobson, Cohn & Price

[57] ABSTRACT

An extrusion die for a blow head for making blown plastic films comprises inner and outer rings, which are made of a ferrous material, particularly steel, and define between them an annular orifice. Those surfaces of the inner and outer rings which define the die orifice are covered by a layer consisting of a metallic material having a higher thermal conductivity than steel.

5 Claims, 3 Drawing Figures

EXTRUSION DIE FOR A BLOW HEAD FOR MAKING BLOWN PLASTIC FILMS

BACKGROUND OF THE INVENTION

1. Field of the Invention

This invention relates to an extrusion die for a blow head for making blown plastic films, which die comprises inner and outer rings, which are made of a ferrous material, particularly steel, and define between them an annular orifice.

2. Description of the Prior Art

Because the molten plastic materials flows along paths of different lengths from the extruder screw to the extrusion die or because other inhomogeneities occur, a non-uniform temperature profile around the periphery of the extruded parison may be obtained at the outlet end of the die orifice and may result in the blown plastic film in thickness variations which are out of tolerance.

In an extrusion die of the kind described first hereinbefore, which has been disclosed in German Patent Publication No. 21 40 194, the outer ring is divided into a plurality of temperature control segments, which are provided with separate temperature control chambers, which are connected to separate inlet and outlet lines for the heating or cooling fluid. The occurrence of zones which are at different temperature in the molten plastic material owing to different flow rates and flow paths of said material can be avoided if the feeding of the heating or cooling fluid to the temperature control chambers is properly controlled.

Published German Application No. 32 11 833 discloses an extrusion die which is of the kind described first hereinbefore and in which the inner and outer rings are formed with annular gaps, which are filled in part with a heat exchange fluid that is adapted to be evaporated and re-condensed at temperatures in the operating temperature range of the blow head so that temperature variations occurring over the height and/or periphery of the annular gap can be compensated in that the heat exchange fluid evaporates in relatively hot portions of the annular gap and re-condenses in relatively cold portions.

SUMMARY OF THE INVENTION

It is an object of the invention to provide an extrusion die which is of the kind described first hereinbefore and in which a more uniform temperature profile in the axial and peripheral directions can be obtained with the aid of simpler means.

The object is accomplished in accordance with the invention in that those surfaces of the inner and outer rings which define the die orifice are covered by a layer consisting of a metallic material having a higher thermal conductivity than steel.

The layer made of a material having a high thermal conductivity results in an equalization of temperature in the axial and peripheral directions and is capable of delivering absorbed heat to the molten material. A temperature equalization in the opposite sense will take place when the molten material is hotter than the layer. The layer provided in accordance with the invention results in an equalization of the temperature of the molten material adjacent to the surfaces so that tubular films of higher quality and particularly smaller thickness variations can be made.

Steel has a thermal conductivity of about 0.12 cal/(cm×s×degree)

Alloys which have a high thermal conductivity and may be used in accordance with the invention have a thermal conductivity of about 0.7 cal/(cm×s×degree)

The layers desirably consist of bushings, which are mounted on the rings and can be replaced in case of need.

A heat-insulating layer which promotes an equalization of temperature in the axial and peripheral directions may be provided between the bushings and the rings.

The layer may alternatively consist of a sprayed or centrifugally applied coating.

Within the scope of the invention the inner and outer rings and/or those surfaces of the liners which face said rings may be formed with grooves, which define chambers, which are connected to lines for conducting cooling or heating fluids.

DETAILED DESCRIPTION OF THE PREFERRED EMBODIMENTS

Figure 1:
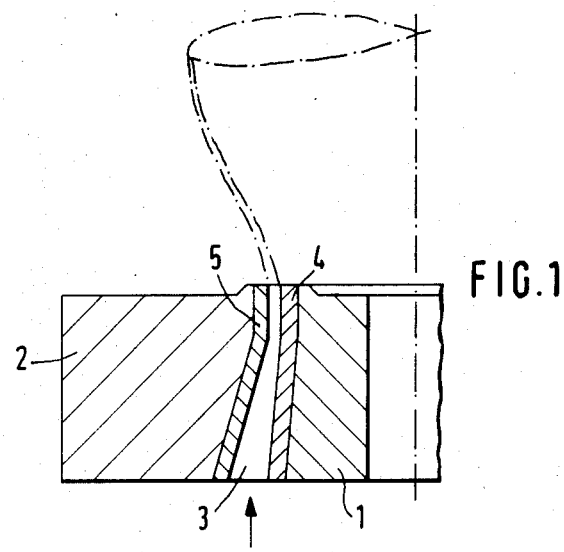
FIGS. 1 to 3 are transverse sectional views showing different embodiments of annular extrusion dies.

Embodiments of the invention will now be explained more in detail with reference to the drawing.

The annular die shown in FIG. 1 comprises an inner ring 1 and an outer ring 2, which are secured to a usually composite distributor of the blow head by means which are not shown. The rings 1, 2 define between them an annular space, which tapers upwardly in wedge shape in cross-section. In a certain part of the axial length of the annular space, the upper portion thereof has a uniform width. Those surfaces of the rings 1, 2 which face the annular space 3 are provided with bushings 4, 5 made of a metal which has a high thermal conductivity.

Figure 2:
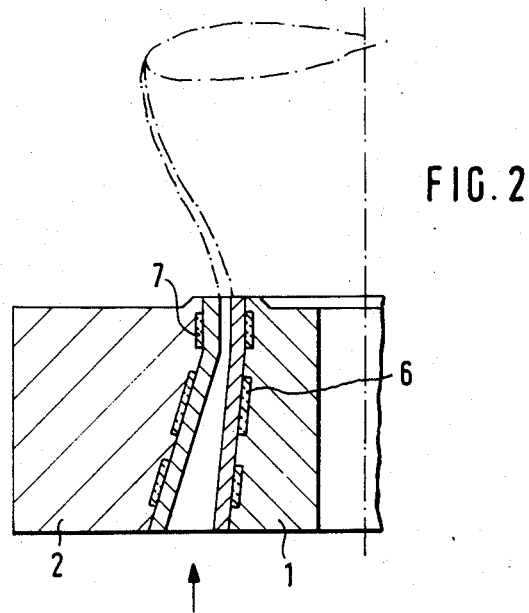

In the embodiment shown in FIG. 2 the rings 1, 2 are formed with annular grooves 6, 7 in those surfaces which define the orifice 3. Said annular grooves are filled with a heat-insulating material.

Figure 3:
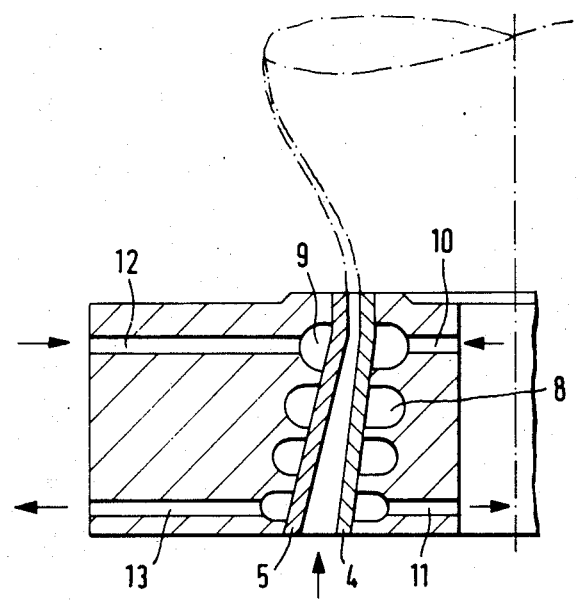

In the embodiment shown in FIG. 3 the rings 1, 2 are formed with annular grooves 8, 9, which in each ring communicate with each other and with the inlet and outlet lines 10, 11 and 12, 13 so that cooling or heating fluids can flow through the annular grooves, which are covered by the bushings 4, 5.

We claim:

1. An extrusion die for a blow head for making blown plastic films comprising inner and outer rings, which are made of steel, and define between them an annular orifice, characterized in that the entire surfaces of the inner and outer rings which define the die orifice are covered by a layer consisting of a metallic material having a thermal conductivity of about 0.7 cal/(cm×s×degree) to obtain a uniform temperature profile in both axial and peripheral directions.

2. An extrusion die according to claim 1, characterized in that each layer consists of a bushing.

3. An extrusion die according to claim 2, characterized in that a heat-insulating layer is provided between the bushings and the inner and outer rings.

4. An extrusion die according to claim 1, characterized in that the layer consists of a sprayed or centrifugally applied coating having a thickness of at least 0.2 mm.

5. An extrusion die according to claim 1, whereby the inner and outer rings are formed with grooves, which define chambers, which are connected to lines for conducting cooling or heating fluids.

* * * * *